US006833733B2

(12) United States Patent
Tangen

(10) Patent No.: US 6,833,733 B2
(45) Date of Patent: *Dec. 21, 2004

(54) APPARATUS FOR IMPROVING BUS CAPACITY

(75) Inventor: Wayne A. Tangen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/651,422

(22) Filed: Aug. 29, 2003

(65) Prior Publication Data
US 2004/0036502 A1 Feb. 26, 2004

Related U.S. Application Data

(63) Continuation of application No. 10/108,082, filed on Mar. 25, 2002, now Pat. No. 6,653,863.

(51) Int. Cl.[7] ............................................. H03K 10/075
(52) U.S. Cl. ............................... 326/82; 326/26; 326/90
(58) Field of Search ............................. 326/26, 82, 83, 326/86, 89, 90

(56) References Cited

U.S. PATENT DOCUMENTS

| 5,905,389 A | 5/1999 | Alleven |
|---|---|---|
| 6,356,140 B1 | 3/2002 | Bell |
| 6,525,609 B1 | 2/2003 | Behzad |

Primary Examiner—Don Le

(57) ABSTRACT

A two-wire serial bus allows bus mastering by any device on the bus utilizing bus pull-ups. In systems with long bus lengths or large numbers of devices, rise times suffer unless accelerated. An operational amplifier (Op Amp) controlled current source is utilized to provide pull-up current for bus lines. The Op Amp provides precise control of the current value and the slew rate required to meet stringent demands of the two-wire serial bus. A voltage divider sets the input voltage to the Op Amp, and a transistor gates the Op Amp current to the bus until it saturates.

6 Claims, 3 Drawing Sheets

APPARATUS FOR IMPROVING BUS CAPACITY

CROSS-REFERENCE TO RELATED APPLICATIONS

This application is a continuation of application Ser. No. 10/108,082, filed Mar. 25, 2002, now U.S. Pat. No. 6,653,863.

FIELD OF THE INVENTION

The present invention generally relates to electrical buses.

BACKGROUND OF THE INVENTION

The I2C bus was developed in the early 1980's to provide an easy way to connect a computer processor unit (CPU) to other peripheral semiconductor devices located in a television set.

Normal computer systems typically use byte-wide or wider buses to accomplish this task. This solution results in a large number of copper tracks on printed circuit boards (PCBs) to route the address and data lines required, not to mention a number of address decoders and logic required to connect everything. In mass production items such as television sets, video cassette recorders (VCRs), and audio equipment, this is not an acceptable solution. In these products, every component counts—and one component fewer means more money for the manufacturer and less expensive products for the customer.

Furthermore, a large number of control lines imply that a system is more susceptible to disturbances by Electromagnetic Compatibility (EMC) and Electrostatic Discharge (ESD). The research done by Philips Labs in Eindhoven (The Netherlands) resulted in a two-wire communication bus called the I2C bus. I2C is an acronym for Inter-IC bus. The I2C bus' name literally explains its purpose: to provide a communication link between integrated circuits.

Today, the extent of this I2C bus goes much further than audio and video equipment. The I2C bus is generally accepted in the electronics industry. Offspring of the I2C bus, such as D2B bus and ACCESS bus, have found their ways into computer peripherals like keyboards, mice, printers, monitors, etc. The I2C bus and similar arrangements have been adopted by several leading chip manufacturers such as Xicor, SGS-Thomson, Siemens, Intel, TI, Maxim, Atmel, and Analog Devices.

An I2C bus physically comprises two active bus signal lines, conductors or wires and a ground connection. Both of the active wires, having acronyms of SDA and SCL, are bidirectional, where SDA is the serial data line and SCL is the serial clock line. This means that these lines can be driven either by the semiconductor device or an external device. To avoid damage to the semiconductor device; i.e., commonly known as "the fried chip" effect, these bus signal lines typically use open-collector or open-drain (depending on the technology) outputs.

The I2C bus (and similar arrangements) interface is constructed around an input buffer and an open-drain or open-collector transistor. When nothing is happening on the bus, the bus lines are in a logic HIGH state or Asserted state. To put information on the bus, a semiconductor device drives its output transistor, thus pulling the bus to a LOW or negated level. Typically an external PULL UP resistor is then utilized to pull the bus lines back to a logic HIGH state when released by the semiconductor device. When the bus is IDLE (no activity) both lines are at a logic HIGH state. These pull up resistors in the devices are often actually small current sources or may even be nonexistent.

One advantage of this bus concept is that it has a "built-in" bus mastering technique. Whenever the bus is "occupied" by a semiconductor device that is sending a 0, any other semiconductor device looses its capability to master the bus themselves and transmit.

However, the open collector technique has a drawback too. If you have a long bus, it will have a serious effect on the speed of the circuit. Long lines present a capacitive load on the output. Since the pull up resistor is passive, the circuit response time (RC time constant) will be reflected onto the shapes of the signals. The higher the RC time constant for a circuit, the slower the response for the circuit. This is due to the effect that it influences the "sharpness" of the edges of the shapes of the signals for the I2C bus. At a certain point, the logic circuits of a semiconductor die will not be able to distinguish clearly between a logic state 1 and a logic state 0.

However, even this solution fails when faced with a large number of semiconductor devices having long traces as parts of circuits such that the bus capacitance is very high, resistors meeting the pull up current limits cannot produce rise times with the bus performance specification.

One solution to this is the usage of a "bus accelerator" device that detects when the bus voltage begins to rise and produces an extra pulse of pull up current during the edge of a signal shape to ensure that the overall rise time performance specification is met. The bus accelerator device then turns off when the bus voltage stops rising. However, this bus accelerator device expects to see a minimum slew rate at a particular voltage point on the edge of the signal shape before it will turn on, but, in the case of high numbers of devices with long traces as parts of circuits, bus capacitance can be high enough that pull up resistors cannot guarantee meeting this performance specification requirement. In other words, although at zero (0) volts, the slew rate meets the bus accelerator's requirements, at required voltage points, the slew rate performance has dropped off due to the logarithmic nature of the resistor-capacitor (RC time constant) voltage step response.

Another solution that has been used in the prior art is to replace the pull-up resistor with a constant current source. While many different constant current sources have been used, such as current mirrors and other commercially available current sources, all exhibit flaws such as excessive current variability or high dropout voltage, for example.

It would thus be advantageous for a large number of bus devices be able to be connected to a relatively long two-wire serial bus without performance and throughput loss. It would also be advantageous to more accurately control the current utilized to pull up and master the bus.

BRIEF SUMMARY OF THE INVENTION

A two-wire serial (TWS) bus allows bus mastering by any device on the bus utilizing bus pull ups. In systems with long bus lengths or large numbers of devices, rise times suffer unless accelerated. An operational amplifier (Op Amp) controlled current source is utilized to improve slew times for a bus accelerator. The Op Amp provides precise control of the current value and the slew rate or rise time required to meet the stringent requirements of the TWS bus.

A voltage divider is utilized to drive the non-inverting Op Amp input. This drives the voltage of the inverting Op Amp input. This input is tied to the input of a transistor. The transistor base is tied to the Op Amp output and the Op Amp output is tied to the bus. When turned on, current flows through the transistor to the bus until the bus voltage has been driven high, resulting in faster and more precise rise times.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one (1), the logically false state will be a logic level zero (0), and if the logically true state is a logic level zero (0), the logically false state will be a logic level one (1).

Figure 1:
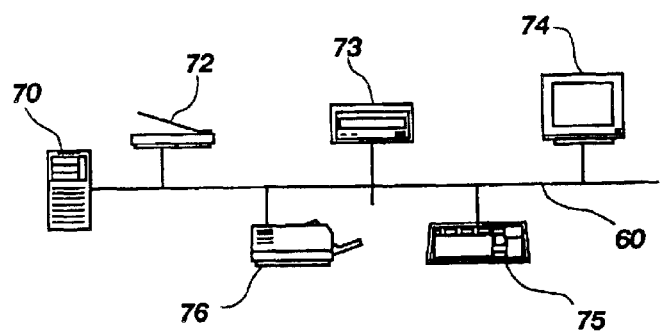
FIG. 1 is a block diagram illustrating a two-wire serial (TWS) bus coupling a plurality of devices, in accordance with an embodiment of the present invention.

FIG. 1 is a block diagram illustrating a two-wire serial bus 60 (hereinafter referred to as "TWS bus 60") coupling a plurality of devices, in accordance with an embodiment of the present invention. In this figure, the TWS bus 60 couples a computer 70, a scanner 72, a CD recorder 73, a monitor 74, a keyboard 75, and a printer 76. This is illustrative only. In one embodiment of the present invention, the TWS bus 60 comprises a Titan bus sold by the Hewlett-Packard Company, Palo Alto, Calif., that utilizes the I2C bus protocol, but varies slightly from such bus in its electrical specifications. Other serial buses are also within the scope of this invention.

Figure 2:
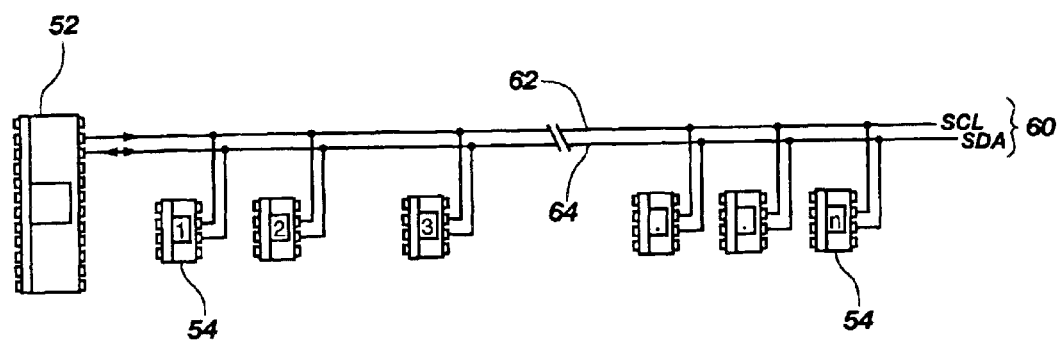
FIG. 2 is a block diagram illustrating the two-wire serial (TWS) bus shown in FIG. 1 in more detail.

FIG. 2 is a block diagram illustrating the TWS bus 60 shown in FIG. 1 in more detail. The TWS bus 60 consists of two-wires: a System Clock line 62 and a System Data line 64. Both of these wires are bidirectional. In this figure, seven interface chips are shown coupled to the TWS bus 60. One of these is a master interface chip 52. The other interface chips are slave interface chips 54. Note that in the I2C protocol, a plurality of the devices coupled to the bus may at some time or another time be the bus master. Thus, this figure is illustrative only, with a typical TWS bus 60 allowing multiple bus masters, but only one bus master at any specific time.

The TWS bus interface is built around an input buffer and an open-drain or open-collector transistor. When nothing is happening on the bus, the bus lines are in a logic HIGH state. A device drives one or both of the bus lines LOW in order to communicate. In the prior art, each interface semiconductor die includes a pull up resistor to drive the bus line(s) back to a HIGH state when released by a device.

Figure 3:
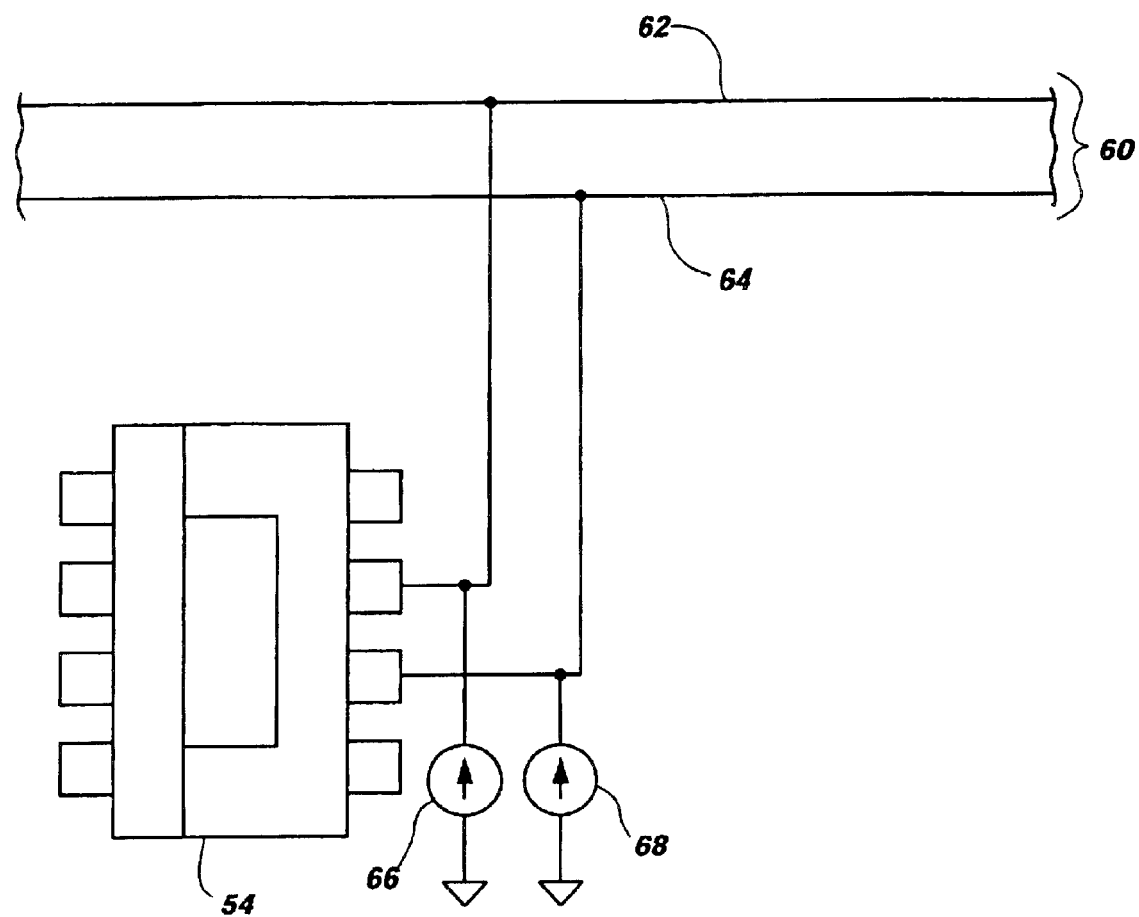
FIG. 3 is a block diagram of the TWS bus shown in FIG. 2 in accordance with an embodiment of the present invention.
Figure 4:
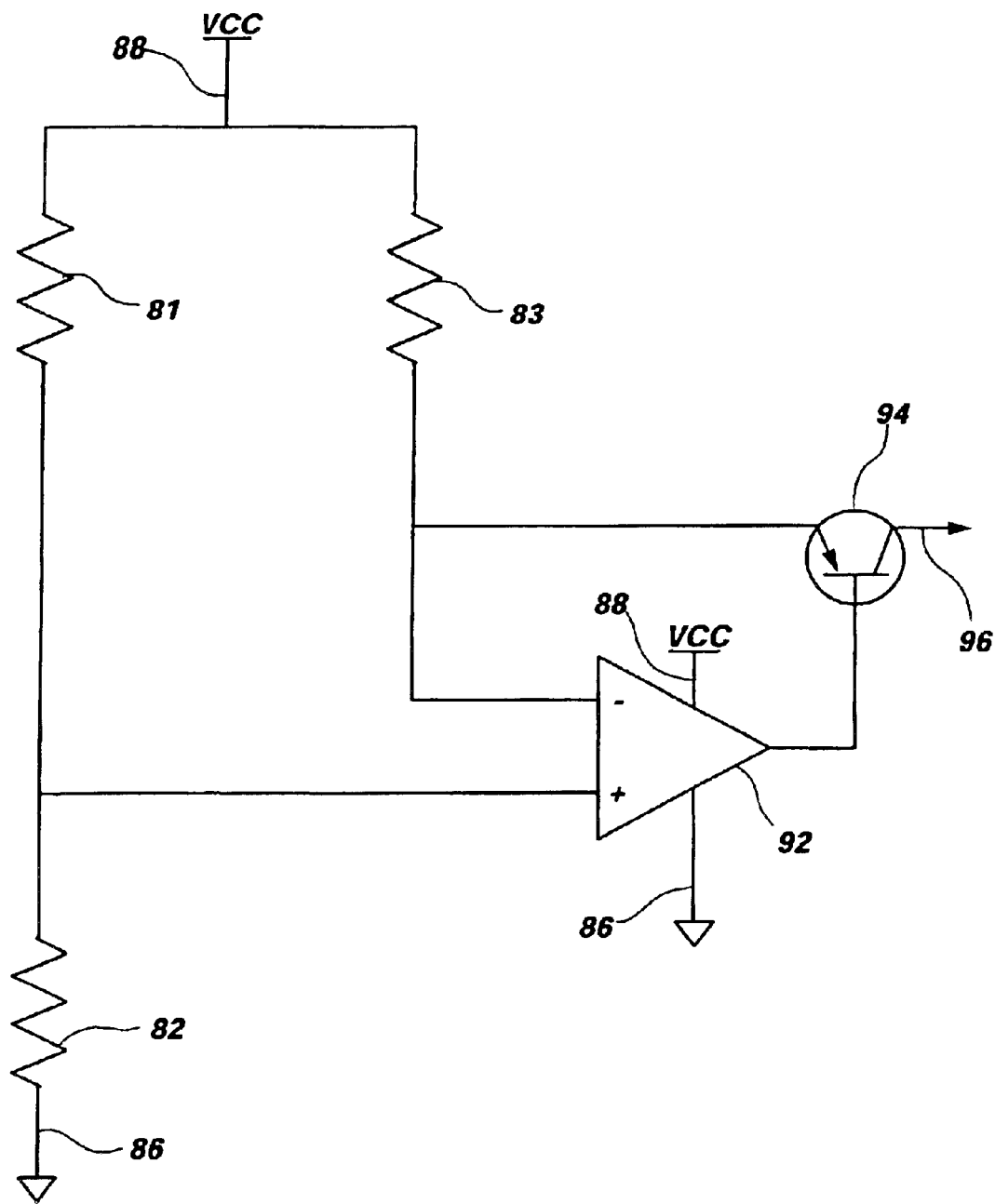
FIG. 4 is a block diagram illustrating the current source circuit shown in FIG. 3, in accordance with an embodiment of the present invention.

FIG. 3 is a conceptual block diagram of the TWS bus 60 shown in FIG. 2 according to an embodiment of the present invention. The TWS bus 60 includes interface circuit 54. Pull-up resistors (not shown) typically utilized with buses such as the TWS bus 60 are replaced with constant current sources 66, 68. An operational amplifier (Op Amp) (92 as shown in FIG. 4) is utilized to control the current value and the dropout voltage as well as other characteristics of the current source 66, 68. The Op Amp provides accurate control of the desired current value ensuring that the bus pull-up voltage exceed the bus 60 high-level voltage specifications and that a maximum slew rate (i.e. rise time) will be achieved.

FIG. 4 is a block diagram illustrating a portion of the current source 66, 68 shown in FIG. 3, in accordance with one embodiment of the present invention. This interface circuit 52, 54 portion provides very accurate control of the amount of current provided and replaces the pull up resistors typically utilized with TWS buses 60 in the prior art. This invention provides the ability to couple a large number of devices to a TWS bus 60 without loss of performance or throughput. As with the prior art, the present invention can be utilized with or without a bus accelerator.

Referring now to FIG. 4, a first resistor R1 81 is connected to $V_{cc}$ 88 and the positive terminal of an Op Amp U1 92. A second resistor R2 82 is also coupled to the non-inverting (+) input to Op Amp U1 92 and is coupled to ground 86. A third resistor R3 83 is coupled between $V_{cc}$ 88 and the inverting (−) terminal of Op Amp U1 92. The Op Amp U1 92 is also coupled to $V_{cc}$ 88 (positive supply voltage) and ground 86 (negative supply voltage). Also coupled to the inverting (−) input to Op Amp U1 92 is the emitter of a bipolar transistor Q1 94. The collector of transistor Q1 94 provides the output from the circuit 96 and is coupled to the TWS bus 60 (not shown). The base of transistor Q1 94 is coupled to the output of Op Amp U1 92.

The first two resistors: R1 81 and R2 82 act as a voltage splitter between $V_{cc}$ 88 and ground 86 to set up a reference voltage for Op Amp U1 92. The Op Amp U1 92 drives its output to force the voltage across the third resistor R3 83 to match that across resistor R1 81, thereby establishing a fixed current through resistor R3 83. This fixed current passes out through the emitter of the transistor Q1 94, assuming that the transistor Q1 94 is not saturated, and into the TWS bus 60. If transistor Q1 94 is saturated, it means that the bus voltage has reached its final HIGH state, and the current through resistor R3 93 goes out the base of transistor Q1 94 and will be pulled up to well above the bus' high-level voltage specification.

The values of the first two resistors: R1 81 and R2 82 are preferably set such that the voltage at the noninverting (+) input of the Op Amp U1 92 is within several tenths of a volt of $V_{cc}$ 88. This ensures that the TWS bus 60 voltage will be pulled up well above the bus' high-level voltage specification.

The pull up resistors in the prior art provided a slew rate for a signal shape dependent upon a logarithmic RC time constant. Usage of the Op-Amp U1 92 gated by transistor Q1 94 provides a slew rate constant at a maximum value—regardless of how many devices are connected to the TWS bus 60.

In one embodiment, transistor Q1 94 may be a PNP bipolar transistor, but also may be of other types, such as a MOSFET. Bipolar transistors typically currently exhibit less parasitic capacitance and thus will not add as much capacitance to the TWS bus 60 as other types of transistors.

The accuracy of the pull up current level depends primarily on $V_{cc}$ 88 tolerance, tolerance on the values of resistors R1 81, R2 82, and R3 83, input current, and offset voltage of the Op Amp U1 92 and the type of transistor Q1 94. Assuming that resistors R1 81, R2 82, and R3 83 are precision resistors, Op Amp U1 92 contains FET inputs, and Q1 94 is a typical small-signal transistor, then the dominant effect on current accuracy is the tolerance on $V_{cc}$ 88. In other words, this circuit can be made nearly as accurate as the supply voltage.

The accuracy of the pull up current level can, therefore, be significantly increased by utilization of a controlled current source such as illustrated in FIGS. 3 and 4. This results in improved pull up slew rates, which in turn provides the ability to support more devices and longer line lengths on a TWS bus 60.

Those skilled in the art will recognize that modifications and variations can be made without departing from the invention. Therefore, it is intended that this invention encompass all such variations and modifications as fall within the scope of the appended claims.

What is claimed is:

1. A circuit coupled to a bus for providing a pull-up voltage comprising:
   a constant current source coupled to a first reference voltage and configured for further coupling to the bus; and
   an operational amplifier coupled to the constant current source, the operational amplifier configured to control the constant current source based on a second reference voltage derived from the first reference voltage.

2. A circuit for pulling up voltage for a two-wire serial bus, comprising:
   a circuit for driving an output voltage to a specified voltage;
   a circuit for providing an output current as controlled by the output voltage; and
   a circuit for gating the output current to the two-wire serial bus while the output voltage is not equal to the specified voltage.

3. The circuit in claim 2, further comprising:
   a circuit for enabling the gating of the output current to the two-wire serial bus.

4. A device capable of being coupled to a bus, wherein the device includes interface circuitry comprising:
   an operational amplifier having a first input, a second input receiving a first reference voltage, and an output;
   a first resistor coupled between a second reference voltage and the first input of the operational amplifier; and
   a first transistor having an emitter coupled to the first input of the operational amplifier, a collector coupled to the bus, and a drain coupled to the output of the operational amplifier.

5. A circuit for pulling up voltage for a bus, comprising a means for providing a constant current to the bus when a voltage on the bus is less than a specified voltage, including:
   a means for providing operational amplification having a first input, a second input receiving a first reference voltage, and an output;
   a means for providing resistance coupled between a second reference voltage and the first input of the means for providing operational amplification; and
   a constant current means coupled between the first input and the bus and controlled by the means for providing operation amplification.

6. The circuit in claim 5 wherein:
   the means for providing the constant current is controlled by an operational amplifier.

* * * * *